(12) United States Patent
Brent et al.

(10) Patent No.: US 6,272,358 B1
(45) Date of Patent: *Aug. 7, 2001

(54) VOCODER BY-PASS FOR DIGITAL MOBILE-TO-MOBILE CALLS

(75) Inventors: Kenneth Wayne Brent, Miami, FL (US); Michael Dwayne Chambers, Plainfield, IL (US); Anne Yin-Fee Lee, Naperville, IL (US); Chinmei Chen Lee, Woodbridge, IL (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,362

(22) Filed: Jun. 4, 1998

(51) Int. Cl.[7] .............................. H04B 1/38; H04B 14/04; H04M 1/00; H04Q 7/20; H04L 12/66

(52) U.S. Cl. ...................... 455/560; 455/445; 370/352; 375/242

(58) Field of Search .................................. 455/403, 422, 455/560, 561, 445; 370/349, 351–352, 338, 536; 704/19; 375/242

(56) References Cited

U.S. PATENT DOCUMENTS

| 5,608,779 | * | 3/1997 | Lev et al. | 455/436 |
|---|---|---|---|---|
| 5,729,536 | * | 3/1998 | Doshi et al. | 370/338 |
| 5,793,810 | * | 8/1998 | Han et al. | 375/242 |
| 5,953,331 | * | 9/1999 | Duncan et al. | 370/352 |
| 5,978,676 | * | 11/1999 | Guridi et al. | 455/426 |
| 5,995,923 | * | 11/1999 | Mermelstein et al. | 704/19 |
| 6,034,994 | * | 3/2000 | Yoon | 375/242 |
| 6,070,089 | * | 5/2000 | Brophy et al. | 455/560 |

* cited by examiner

Primary Examiner—Tracy Legree
(74) Attorney, Agent, or Firm—Werner Ulrich

(57) ABSTRACT

Apparatus for performing a smooth by-pass of extra Vocoders in a mobile station to mobile station connection. Vocoders are used in mobile stations using digital signals to communicate with base stations. When the vocoded signals are to be transmitted over the public switched telephone network, they are normally converted into the kinds of signals such as 64 Kb per second pulse code modulation (PCM), used in the public switched network. In accordance with one preferred embodiment of this invention, when a connection is made between two mobile units, the connection is made via a separate asynchronous transfer mode (ATM) network. Arrangements are also available to switch between the ATM network and Vocoders connected to the public switched telephone network when it is necessary to transmit a PCM signal to a land based station, or other equipment. Advantageously, this arrangement allows switches between by-pass mode and non/by-pass mode to be made seamlessly without requiring a synchronous operation of that switch in the two switching systems involved in a connection, and therefore, further improves the voice quality during Vocoder by-pass because there is no disruption of the voice path when the by-pass mode is activated or deactivated.

11 Claims, 2 Drawing Sheets

VOCODER BY-PASS FOR DIGITAL MOBILE-TO-MOBILE CALLS

TECHNICAL FIELD

This invention relates to method and apparatus for improving the quality of mobile to mobile telephone connections using Vocoders.

Problem

Conserving bandwidth in the mobile radio spectrum has always been a major objective. Recent break-throughs in digital mobile telephony feature both time division multiple access pulse code modulation, (TDMA), and code division multiple access (CDMA), are two of the major digital systems in use in mobile telephony to achieve this conservation of spectrum. Digitized speech, while being transmitted within the public switched telephone network in PCM form at a 64 kilobit (Kb) per second rate, can be readily compressed using a number of techniques. One of the best bit rate compression techniques is the use of Vocoders which allows fairly high quality speech to be transmitted at rates of 13 Kb per second and even less. However, all Vocoders introduce quantitization errors during the voice encoding and decoding processes.

In a typical mobile to mobile connection, illustrated in FIG. 1, mobile station 1 generating a voice signal, has that voice signal go through a first Vocoder 11 in the mobile station on its way to a central office switch 50, containing a speech handler 13. The speech handler 13 contains a second Vocoder 21 for converting the vocoded signal to a pulse code modulation signal for transmission via link 30 between the switch 50 serving mobile station 1, and the switch 51, serving the destination mobile station 2. In that switch 51, another speech handler 14 accepts the PCM signal received from link 30, and converts that signal to a vocoded signal. This vocoded signal is transmitted by radio to mobile station 2, where a vocoder 12 decodes the vocoded signal, and generates an analogue signal for driving the speaker of mobile station 2. It can be seen that in this connection that 4 Vocoders are used. The use of 4 Vocoders reduces the voice quality of the speech from mobile station 1 to mobile station 2 because each pair of back to back encoders and decoders introduces substantial quantitization error. An additional problem is that 4 Vocoders in tandem introduce extra delay in the transmission of speech signals.

Solution

It is therefore desirable to eliminate the two middle Vocoders, and various solutions for performing that function, called Vocoder by-pass, have been proposed. Applicants have recognized that all of these proposed solutions have one or more problems, including the following:

The insertion or removal of the two middle Vocoders must be synchronized because if it is staggered, no speech can pass between the two end stations during the stagger interval. These actions may occur in the middle of a call. A connection which starts out as a mobile to mobile connection may subsequently be changed to a mobile to PSTN connection if three-way calling is invoked. Similarly, a mobile to PSTN connection which, of course, cannot use Vocoder by-pass can be transformed during the course of a call into a mob-ile to mobile connection frequently by first having a three-way connection, and then having the land based station drop off the call.

Second, the transmission of vocoded speech packets over 64 Kb PCM facilities, required if the two middle Vocoders are to be by-passed, can only be accomplished seamlessly if the packets so transmitted remain intact, i.e., retain their bit integrity. There are a number of facilities in PCM voice switching systems which interfere with such clear transmission of packetized signals, including provisions for echo cancellation, and bit robbing for signaling purposes. While there are certain specialized facilities for transmitting pure 64 Kb data, these specialized facilities are segregated from the normal voice facilities, and to require mobile to mobile calls to use one of these segregated facilities, would create major problems of administration and cost.

Applicants have recognized that a problem of the prior art is that there is no truly satisfactory arrangement for Vocoder by-pass.

The above problem is solved and an advance is made over the prior art in accordance with our invention wherein when a mobile to mobile call is detected, a connection is established between the switches serving the two mobiles over a high speed data network. In one of the Applicants' preferred embodiments, this high speed data network is an asynchronous transfer mode (ATM) network, and a link of that network is established between the two switches. In alternative embodiments, other data networks can be used, preferably, those already deployed for other uses. Because mobile to mobile calls frequently are transformed into calls involving a land based telephone connected to the public switched telephone network (PSTN) a separate PCM connection between the two switches is established simultaneously. The conversation is sent over the PCM facility, and, in the Vocoder by-pass connection state, also over the high speed data network path of these facilities. (Alternatively, signals are transmitted over the PCM path only when the high speed data network path is not being used). If one of the switches deactivates Vocoder by-pass, that switch will simply transmit PCM signals over the PCM path after having decoded the vocoded speech signals received from its connected mobile station. The other switch will then recognize that no signals are coming in over the high speed data network path, but that signals are coming over the PCM path, and will simply take the received PCM signals and now route these signals through its own Vocoder. Effectively, the switch from the two Vocoder connection to the four Vocoder connection is accomplished in the two directions of transmission at slightly different times, but this is not a problem since the transition is smooth for each of the two directions. Advantageously, this arrangement allows Vocoder by-pass to be invoked without special administration of transmission facilities, and avoids problems of trying to synchronize the switch between using and not using Vocoder by-pass.

In accordance with one preferred embodiment of Applicants' invention, vocoded voice frames are received in a frame selector of a speech handler within a switch. The frame selector selects between frames received from different cell sites in order to select the frame received with the strongest signal. The frame selector also performs the function of passing a frame either to a Vocoder, for conversion to PCM, or to a by-pass function for transmission of the frame over the high speed data network. Advantageously, existing equipment can be used in a slightly enhanced functionality to perform the bypass for Vocoder selection.

In accordance with one embodiment of Applicants' invention, frames received over the by-pass path are delayed by passing through a buffer in order that at the time of a switch between the by-pass mode, and the non by-pass mode, the delay in the speech is equalized.

DETAILED DESCRIPTION

Figure 1:
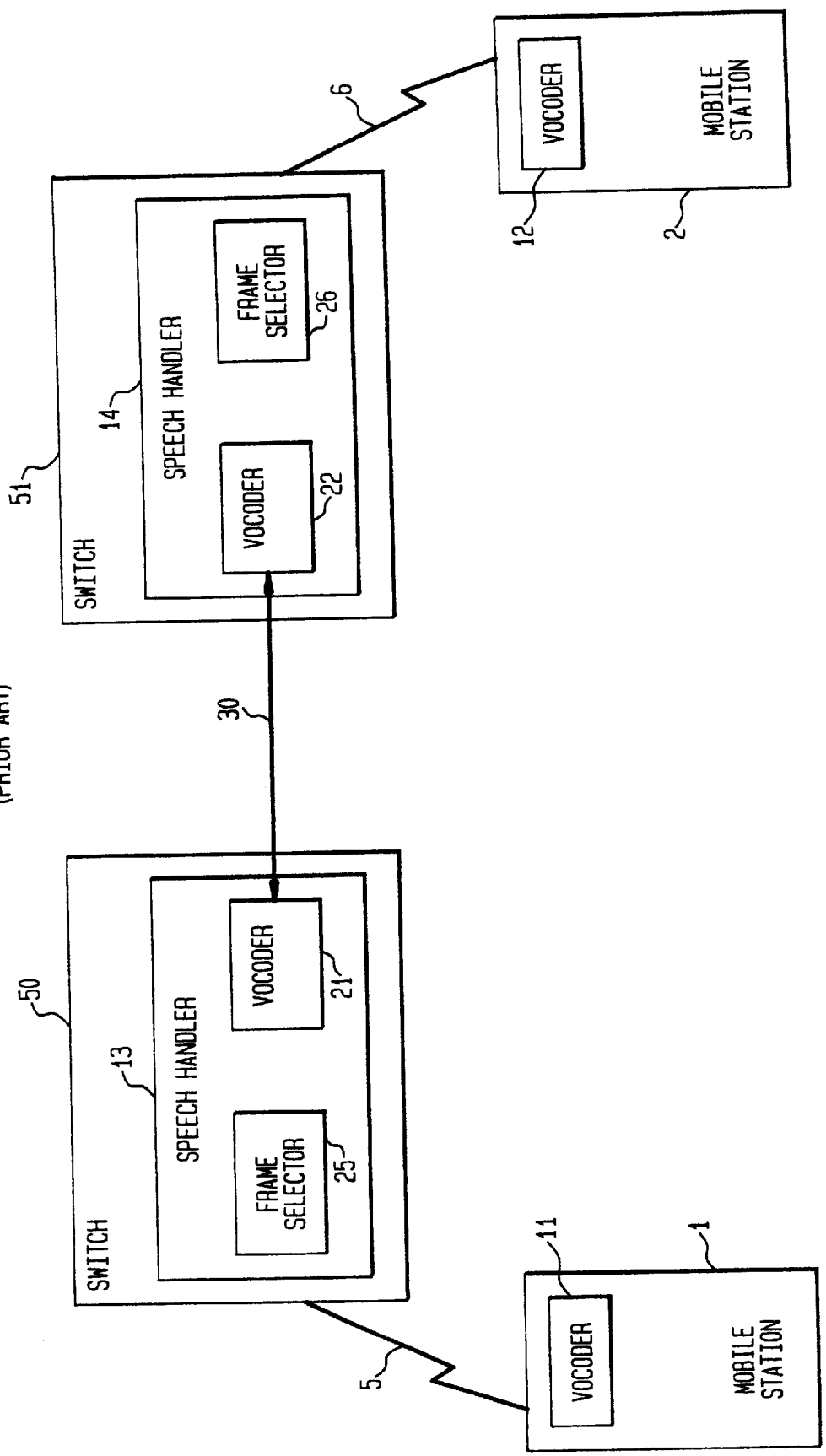
FIG. 1 is a block diagram illustrating the use of 4 Vocoders in a mobile to mobile connection.

FIG. 1 illustrates the key elements of a connection between two mobile stations, 1 and 2. Mobile station 1 includes Vocoder 11 for converting the analogue speech signal received from a microphone of the mobile station into a set of packets called voice frames for transmission by radio to one or more cell sites, and then to a switch containing speech handler 13. This speech handler includes a frame selector for selecting among voice frames received from mobile station 1 by different cell sites, and passes the best frame on to Vocoder 21 which converts Vocoder voice frames into a 64 Kb per second PCM signal. This signal is sent over transmission facility 30 to the speech handler 14 of the switch serving mobile station 2. Vocoder 22 of speech handler 14 converts the received PCM signal to voice frames which are then transmitted over radio channel 6 to mobile station 2. Vocoder 12 of mobile station 2 decodes the voice frames, and generates an analogue signal for driving the speaker of mobile station 2. The speech connection from mobile station 2 to mobile station 1 is identical; each of the Vocoders converts signals in the two directions of transmissions.

Figure 2:
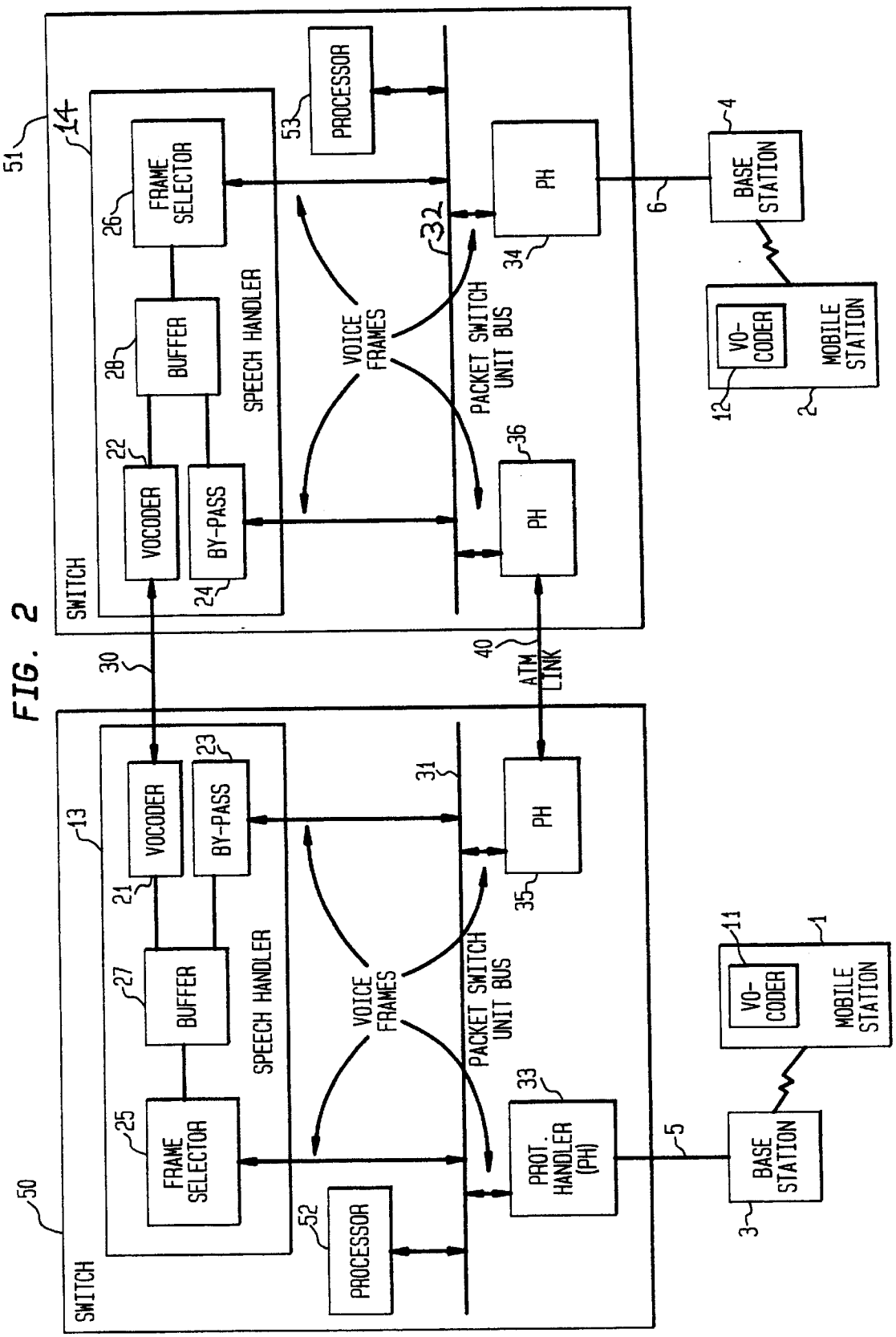
FIG. 2 is a block diagram illustrating Applicants' invention.

FIG. 2 illustrates the operation of Applicants' invention. Voice signals received from the microphone (not shown) of mobile station 1 are converted by Vocoder 11, and are transmitted over a radio channel to base station 3. Base station 3 transmits the received voice frames over a virtual circuit pipe 5 to a protocol handler 33 of switch 50 serving mobile station 1. The protocol handler transmits voice frames to a packet switch unit bus 31, and these voice frames are received by frame selector 25. The frame selector will then send a frame to Vocoder 21 and for the by-pass case, to by-pass function 23. The output of Vocoder 21 is sent over a PCM facility 30 to Vocoder 22 of receiving switch 51; Vocoder 22 will then generate voice packets for transmission to mobile station 2 where these voice packets will be converted by Vocoder 12 into electrical signals for driving the speaker of mobile station 2. Alternatively, the frame selector can send only to by-pass function 23 for the by-pass case.

For the by-pass case, by-pass function 23 transmits voice frames to PSU bus 31 from which protocol handler for ATM 35 receives these voice frames and transmits the voice frames to protocol handler for ATM 36 of receiving switch 51 over ATM link 40. Received voice frames from protocol handler for ATM 36 are transmitted to PSU bus 32 of switch 51, and thence to by-pass function 24 of speech handler 14 of switch 51. From the by-pass function, the received voice frames are transmitted to frame selector 26, or, alternatively stored in a buffer 28 to equalize the delay between directly received voice packets, and voice packets which have been processed through the two Vocoders 21 and 22. Note that while this arrangement minimizes "glitches" during a transition from by-pass to non/by-pass or vice versa, it may not be desirable because it also introduces the full extra Vocoder delay of the 4 Vocoder arrangement. Studies of field experience can be used to determine whether a buffer such as buffer 28 should be used.

Frame selector 26 of speech handler 14 receives its signals either directly from the by-pass function 24 or via buffer 28, and sends these signals to PSU bus 32 which transmits the voice frame signals to protocol handler 34, which transmits the voice frames to base station 4 for transmission over a radio channel to mobile station 2. Mobile station 2 receives these voice frames, and converts them in Vocoder 12 into signals for driving a speaker of mobile station 2.

It is desirable to be able to send tones from and to the mobile stations. A mobile station user may wish to send dual tone multifrequency (DTMF) tones to activate special equipment in a receiving mobile station, or a mobile station user may wish to receive a call waiting tone while talking to another mobile station. When a Vocoder is connected at the switch which is connected to the sender of DTMF or the receiver of the call waiting tone, there is no problem. The Vocoder is prepared to receive a data signal representing a DTMF digit and to generate a DTMF tone signal therefrom, or, in response to a signal from the switch indicating that call waiting tone is to be transmitted, to transmit such a tone. However, during Vocoder by-pass, the normal arrangements for generating tones are absent.

In accordance with this invention, the signals representing DTMF tones are detected in by-pass 23, which then transmits a pre-stored series of packets representing the voice band signal of the corresponding DTMF tone to PSU bus 31. When the switch processor, such as processor 52 of switch 50 detects the need to send a call waiting tone, it sends a signaling message to by-pass 23, which causes that unit to generate a pre-stored series of packets representing the voice band signal of the call waiting tone.

The embodiment described above is only one preferred embodiment. Many other embodiments will be apparent to those of ordinary skill in the art. Without departing from the scope of the invention, the invention is only limited by the attached Claims.

What is claimed is:

1. In a telecommunication system for connection to wireless stations, said wireless stations equipped with Vocoders, apparatus for by-passing Vocoders for converting between vocoded signals, and public switched telephone network digital signals for a call between two wireless stations, comprising:

apparatus for accessing a high speed data network interconnecting switches serving said wireless stations; and apparatus for transmitting vocoded voice frames received from a mobile station to said apparatus for accessing said high speed data network when in a Vocoder by-pass state;

apparatus for establishing a PCM (Pulse Code Modulation) connection for a call between said switches serving said mobile stations;

wherein the PCM connection is established simultaneously with the connection in said high speed data network, but signals are sent only over one of the connections;

wherein a switch between a Vocoder by-pass connection and a connection using Vocoders is detected by the presence of signals in the connection not previously used, or the absence of signals, in the connection previously used.

2. The apparatus of claim 1, wherein said PCM connection transmits signals for the duration of said call.

3. The apparatus of claim 1, wherein said PCM connection transmits signals only when said call is not in the Vocoder by-pass state.

4. The apparatus of claim 1, wherein a Vocoder by-pass connection over said high speed data network is established asynchronously and independently in two directions of transmission.

5. The apparatus of claim 1, wherein said high speed data network is an asynchronous transfer mode (ATM), network.

6. The apparatus of claim 1, wherein said means for transmitting voice frames comprises:

a frame selector for receiving voice frames, and means for transmitting signals from said frame selector to at least one of a Vocoder, and by-pass means for accessing said apparatus for accessing said high speed data network.

7. The apparatus of claim 6, wherein said by-pass means is further connected via a packet bus to said means for accessing said high speed data network.

8. The apparatus of claim 1, wherein said means for accessing said high speed data network comprises a protocol handler, for receiving voice frames from said frame selector, and for transmitting said voice frames to said high speed data network.

9. The apparatus of claim 1, further comprising means for detecting signals representing data representing a DTMF (dual tone multifrequency) signal representing data representing a DTMF signal and for generating signals representing voice band signals representing said DTMF for transmission to said apparatus for accessing said high speed data network when said wireless station is connected on a Vocoder by-pass connection.

10. The apparatus of claim 1 further comprising means responsive to an indication that a tone signal is to be sent to wireless station for generating signals representing voice band signals representing said tone signal when said wireless station is connected on a Vocoder by-pass connection.

11. The apparatus of claim 1, further comprising a buffer means to delay voice signals, received when switching from said PCM connection to a Vocoder by-pass connection, by an amount that matches delay through two Vocoders being by-passed;

whereby continuity of speech signals is preserved in making a transition between the two types of connections.

* * * * *